United States Patent [19]
Reichenbach

[11] 3,820,017
[45] June 25, 1974

[54] ELECTRICAL PROBE TESTER FOR CONTINUITY TESTING CARTRIDGE FUSES IN A FUSE BLOCK

[76] Inventor: William Reichenbach, 238 Java St., Brooklyn, N.Y. 11222

[22] Filed: June 8, 1973

[21] Appl. No.: 368,518

[52] U.S. Cl. .............................. 324/51, 324/72.5
[51] Int. Cl. ............................................ G01r 31/02
[58] Field of Search .................... 324/51, 72.5, 52

[56] References Cited
UNITED STATES PATENTS

| | | |
|---|---|---|
| 1,109,450 | 9/1914 | Mitchell .............................. 324/51 |
| 2,186,212 | 1/1940 | Scoggin .............................. 324/51 |
| 2,195,975 | 4/1940 | Ribble et al. ...................... 324/51 X |
| 2,229,927 | 1/1941 | Kamper .............................. 324/51 |
| 2,505,177 | 4/1950 | Falcone .............................. 324/51 |
| 2,851,659 | 9/1958 | Ladrick .............................. 324/51 X |
| 3,323,041 | 5/1967 | Warner ............................... 324/51 |
| 3,742,345 | 6/1973 | Lacey ................................. 324/52 |

Primary Examiner—Gerard R. Strecker
Attorney, Agent, or Firm—Peter L. Tailer

[57] ABSTRACT

A fuse tester has two probes which extend with offset projections from one end of a cylindrical insulating case, one probe being rotatably mounted so that the probe projections can span different sizes of fuses. The case contains two longitudinally displaced windows behind each of which a test bulb is secured in a loop formed by the fixed probe. One bulb is contacted by the rotatably mounted probe and the other bulb is contacted by a ground wire which extends from the end of the case opposite the probe projections. A resilient spacer within the case between the bulbs divides the case into two light tight compartments and it urges the bulbs apart to maintain their contacts with the ground wire and the rotatably mounted probe.

3 Claims, 8 Drawing Figures

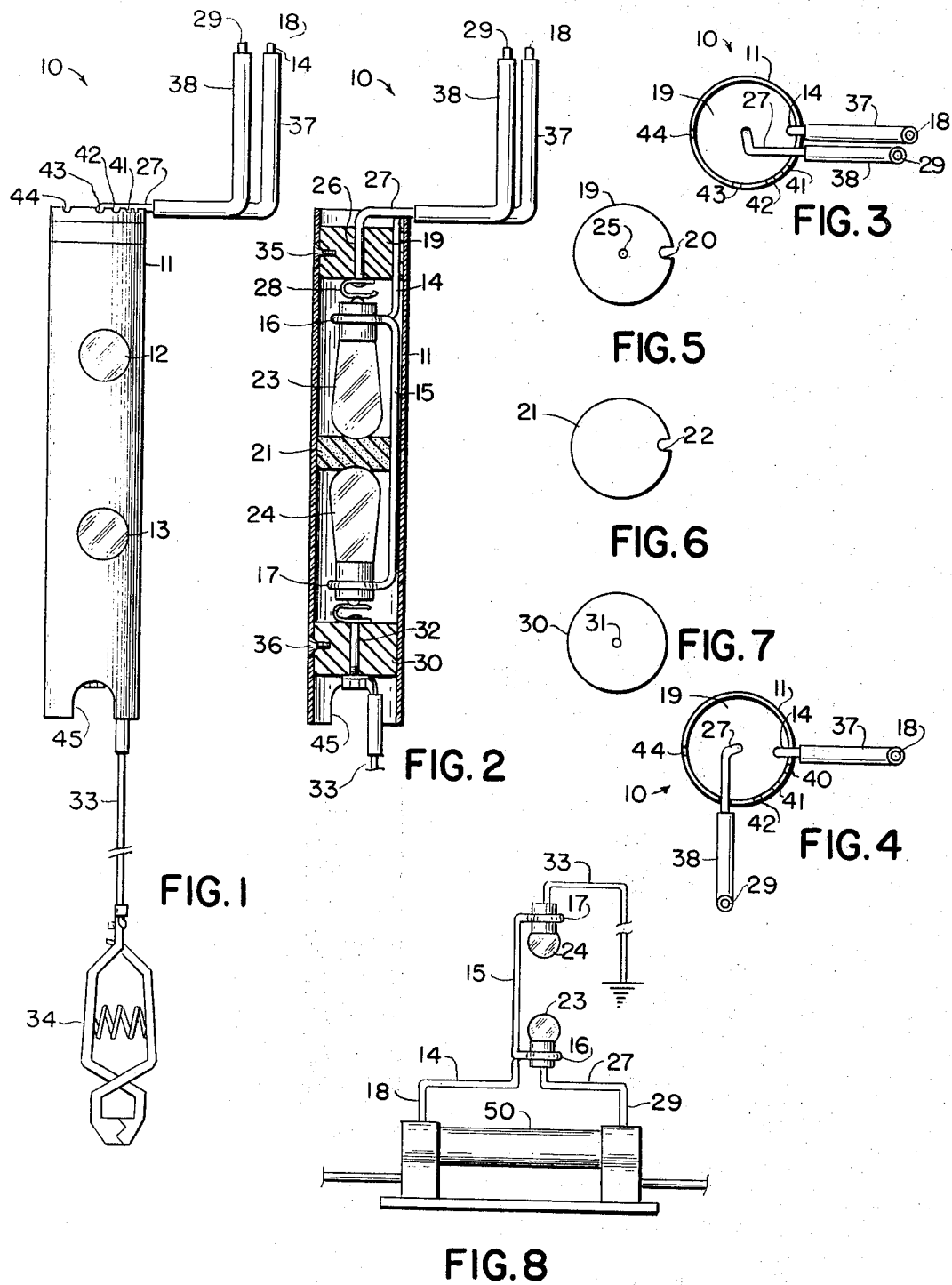

ELECTRICAL PROBE TESTER FOR CONTINUITY TESTING CARTRIDGE FUSES IN A FUSE BLOCK

BACKGROUND OF THE INVENTION

1. Field of the Invention

This invention relates to continuity testers for elements of electrical circuitry, and, more particularly, to fuse testers for cartridge fuses.

2. Description of the Prior Art

With many conventional fuse testers, the fuse must be removed from the fuse block for testing or, if a fuse is tested in the fuse block, both hands are required. The fuse tester of this invention allows a fuse to be tested in location with one hand.

SUMMARY OF THE INVENTION

A fuse tester has a cylindrical case of insulating material containing two longitudinally displaced windows or two longitudinally displaced sets of windows, a first fixed probe having an offset projection extending beyond said case and having two loops formed within said case, first and second test bulbs within said loops adjacent to said windows, a first end plug in said casing securing the projection of said fixed probe, a second probe transfixing said first plug and being rotatably mounted therein to contact said first bulb, said second probe having an offset projection extending beyond said case, a second end plug in the opposite end of said case from said first end plug, a ground contact extending through said second end plug contacting said second bulb, a ground wire connected to said ground contact extending from said case, connecting means at the end of said ground wire, and a resilient spacer between said bulbs restricting light from each of said bulbs to one of said windows and urging said bulbs apart into contact with said ground contact and said second probe.

To test a fuse, said connecting means at the end of said ground wire is connected to grounded metal and the second probe offset projection is rotated to span a given fuse between the projections. With one hand the case is moved so that the first fixed probe contacts the hot or line end of a fuse and the second probe contacts the other end of the fuse with the circuitry activated. If the fuse is good, only the second test bulb connected to or contacted by the ground wire will light. If the fuse is burned out, both bulbs will light and indicate accordingly in the windows of the case.

This invention enjoys many advantages. Not only is it a safe and efficient fuse tester which is easy to use, but it particularly lends itself to be manufactured at a minimum cost as a result of the structure and arrangement of its parts.

Brief Description of the Drawing:

FIG. 1 is a side view of the fuse tester of my invention with a central portion of a ground wire broken away;

FIG. 2 is a longitudinal, vertical section through the fuse tester of FIG. 1 with the ground wire broken away;

FIG. 3 is a top or end view of the fuse tester of FIG. 1;

FIG. 4 is a top view of the fuse tester of FIG. 1 with the rotatably mounted probe rotated to span a fuse between offset probe projections;

FIG. 5 is a top view of an upper end plug;

FIG. 6 is a top view of a resilient spacer and light barrier;

FIG. 7 is a bottom view of a lower plug; and

FIG. 8 is a side view of a fuse in a fuse block being contacted by elements of this invention which are schematically shown to illustrate circuitry involved.

DESCRIPTION OF THE PREFERRED EMBODIMENT

The fuse tester of this invention, generally designated by the reference numeral 10, as a cylindrical case 11 of plastic or other insulating material. Case 11 contains two longitudinally displaced windows 12 and 13. If desired there may be a set of windows at the longitudinal locations of the windows 12 and 13 to enable the fuse tester to be viewed from any side. The windows 12 and 13 may be formed as openings, they may be inset faceted inserts, or they may be of any suitable transparent material.

A fixed probe 14 has a shank 15 extending within case 11.

Shank 15 forms two loops 16 and 17 and has an offset projection 18 extending beyond the top of case 11. An upper rubber plug 19 contains a peripheral notch 20 to receive and secure the shank 15 of probe 14. Spacer 21 contains a peripheral notch 22 to also secure shank 15. Bulbs 23 and 24 are disposed sockets outwards in the loops 16 and 17 compressing the spacer 21 between them, spacer 21 being of a resilient material such as sponge rubber.

Upper plug 19 contains a central aperture 25 through which the shank 26 of the rotatably mounted probe 27 extends to terminate in a contact 28 and an offset projection 29. Lower rubber plug 30 contains a central aperture 31 to receive the ground contact 32 which contacts bulb 24 and has ground wire 33 connected to it. Ground wire 33 has an alligator clamp 34 or other equivalent connecting means fixed to its free end. Screws 35 and 36 penetrate case 11 to fix the plugs 19 and 30 within it. The resilient spacer 21 forces the bulbs 23 and 24 outward to make good contact with the ground contact 32 and with the rotatably mounted probe contact 28. The offset projections 18 and 29 are substantially covered to their tips by insulation 37 and 38.

As shown in FIGS. 1 and 4, the rotatably mounted probe 27 may be rotated to have the offset projections 18 and 29 span a given size of cartridge fuse. If notches 40–44 are formed in the upper end of case 11 to hold the offset projection 29 in a given position, the fuse size corresponding to the position can be inscribed on case 11 by the appropriate notch. Large slots 45 are formed in the bottom end of case 11. These enable ground wire 33 to be wound in them and over the offset projections 18 and 29 when the fuse tester 10 is not in use.

To test a fuse, the alligator clamp 34 is connected to known grounded metal and the rotatably mounted probe 27 is set to span the size of fuse to be tested. Grasping the case 11, probes 14 and 27 are brought in contact with fuse 50 as shown in FIG. 8. Probe 27 should contact the line or hot end of the fuse 50. If the fuse 50 is good and not burned or blown out, only bulb 24 will light. If the fuse 50 is blown, bulbs 23 and 24 will be connected in series and they will both light. Appropriate markings such as "Good" and "Not Good" may be formed on the windows 12 and 13. Such markings are not shown in the drawing.

While this invention has been shown and described in the best form known, it will nevertheless be understood that this is purely exemplary and that modifications may be made without departing from the spirit of the invention.

I claim:

1. A fuse tester comprising, in combination, a cylindrical case of insulating material containing longitudinally displaced windows, a first fixed probe having a shank formed with two loops extending within said case and having an offset projection extending above said case, an upper plug containing a central aperture and having a peripheral notch, said upper plug being disposed in the top of said case with said peripheral notch securing the shank of said fixed probe, a second probe extending through the central aperture of said upper plug to be rotatably mounted therein, said second probe having a contact portion below said upper plug and an offset projection extending above said case, a bulb having a base contact disposed base contact outward in each loop of said fixed probe adjacent to a window in said case, a lower plug in the bottom of said case, a ground contact extending through said lower plug, a ground wire fixed to said ground contact, connection means fixed to the end of said ground wire, and a resilient spacer between said bulbs dividing said case into substantially light tight compartments and urging said bulbs and their base contacts outwards so that the base contact of one of said bulbs contacts said contact portion of said second probe and the base contact of the other of said bulbs contacts said ground contact.

2. The combination according to claim 1 wherein said case contains radially spaced notches in its upper end to rotatably position said second probe so that said offset projections span given fuse sizes.

3. The combination according to claim 2 wherein said case extends below said lower plug and contains slots in which said ground wire may be wound.

* * * * *